(12) United States Patent
Sorensen et al.

(10) Patent No.: US 10,830,616 B2
(45) Date of Patent: Nov. 10, 2020

(54) STEERING WHEEL ANGLE SENSOR AND METHOD FOR FAULT DETECTING OF A STEERING WHEEL ANGLE SENSOR

(71) Applicant: Danfoss Power Solutions ApS, Nordborg (DK)

(72) Inventors: Ole Falck Sorensen, Nordborg (DK); Jorgen Krusborg, Nordborg (DK); Soren Winkler Rasmussen, Nordborg (DK); Dennis Gregersen, Nordborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 257 days.

(21) Appl. No.: 16/043,268

(22) Filed: Jul. 24, 2018

(65) Prior Publication Data

US 2019/0033097 A1 Jan. 31, 2019

(30) Foreign Application Priority Data

Jul. 25, 2017 (DE) .................. 10 2017 116 764

(51) Int. Cl.
*G01B 7/14* (2006.01)
*G01B 7/30* (2006.01)
(Continued)

(52) U.S. Cl.
CPC .......... *G01D 5/2073* (2013.01); *B62D 5/049* (2013.01); *B62D 15/021* (2013.01); *G01D 5/12* (2013.01);
(Continued)

(58) Field of Classification Search
CPC ............ G01D 5/145; G01D 5/14; G01D 5/12; G01D 11/245; G01B 7/30; G01B 7/003; G01B 7/026; G01B 7/14
See application file for complete search history.

(56) References Cited

U.S. PATENT DOCUMENTS

| 2006/0288800 A1* | 12/2006 | Mukai | B62D 5/049 |
| | | | 73/862.326 |
| 2010/0045227 A1 | 2/2010 | Ura et al. | |
| 2013/0319100 A1 | 12/2013 | Kichise | |
| 2014/0191625 A1* | 7/2014 | Kitamoto | H02K 11/25 |
| | | | 310/68 B |
| 2016/0207564 A1* | 7/2016 | Wada | B62D 5/049 |

FOREIGN PATENT DOCUMENTS

| CN | 1701221 A | 11/2005 |
| CN | 1872606 A | 12/2006 |

(Continued)

*Primary Examiner* — Raul J Rios Russo
(74) *Attorney, Agent, or Firm* — McCormick, Paulding & Huber PLLC

(57) ABSTRACT

A steering wheel angle sensor is described comprising a first part and a second part, wherein the first part and the second part are moveable relative to each other in rotational direction and the first part comprises at least one first signal generating means (1, 2) generating a sine signal ($x_2$, $x_5$) in response to an angular position of the second part and at least one second signal generating means (3, 4) generating a cosine signal ($y_2$, $y_5$) in response to the angular position of the second part. Such a steering wheel angle sensor should allow a simple fault detection. To this end fault detecting means (9) are provided, wherein the fault detecting means (9) form a sum of the square of the sine signal ($x_2$, $x_5$) and the square of the cosine signal ($y_2$, $y_5$) and generates a fault signal, if the sum is not within a predetermined range.

16 Claims, 1 Drawing Sheet

(51) Int. Cl.
*G01D 5/20* (2006.01)
*G01D 5/244* (2006.01)
*G01D 5/14* (2006.01)
*G01D 5/12* (2006.01)
*G01D 11/24* (2006.01)
*B62D 5/04* (2006.01)
*B62D 15/02* (2006.01)
*G01B 7/00* (2006.01)
*G01B 7/02* (2006.01)

(52) U.S. Cl.
CPC ............... *G01D 5/14* (2013.01); *G01D 5/145* (2013.01); *G01D 5/24466* (2013.01); *G01D 11/245* (2013.01); *G01B 7/003* (2013.01); *G01B 7/026* (2013.01); *G01B 7/14* (2013.01); *G01B 7/30* (2013.01)

(56) References Cited

FOREIGN PATENT DOCUMENTS

| | | |
|---|---|---|
| CN | 104937380 A | 9/2015 |
| DE | 10142448 A1 | 3/2002 |
| DE | 102014114920 A1 | 4/2015 |
| DE | 102015121717 A1 | 6/2016 |
| DE | 102016102927 A1 | 8/2016 |
| FR | 2 875 347 A1 | 3/2006 |
| FR | 2 970 565 A1 | 7/2012 |
| JP | 2005351848 A | 12/2005 |
| JP | 2010-110147 A | 5/2010 |
| JP | 2012083279 A | 4/2012 |
| JP | 2012-98188 A | 5/2012 |

\* cited by examiner

STEERING WHEEL ANGLE SENSOR AND METHOD FOR FAULT DETECTING OF A STEERING WHEEL ANGLE SENSOR

CROSS-REFERENCE TO RELATED APPLICATION

This application claims foreign priority benefits under U.S.C. § 119 to German Patent Application No. DE 10 2017 116764.1 filed on Jul. 25, 2017, the content of which is hereby incorporated by reference in its entirety.

TECHNICAL FIELD

The present invention relates to a steering wheel angle sensor comprising a first part and a second part, wherein the first part and the second part are moveable relative to each other in rotational direction and the first part comprises at least one first signal generating means generating a sine signal in response to an angular position of the second part and at least one second signal generating means generating a cosine signal in response to the angular position of the second part.

Furthermore, the invention relates to a method for fault detecting of a steering wheel angle sensor, the sensor comprising a first part and a second part, wherein the first part and the second part are moveable relative to each other in rotational direction and the first part comprises at least one first signal generating means generating a sine signal in response to an angular position of the second part and at least one second signal generating means generating a cosine signal in response to the angular position of the second part.

BACKGROUND

The steering wheel angle sensor is used to detect the angle for rotation or the angular position of the steering wheel. The information about the angular position of the steering wheel can, for example, be needed in a case in which a vehicle is steered automatically via a GPS (Global Positioning System) and the driver takes over control over the vehicle, for example, in an emergency case. In such a situation the steering wheel angle is needed as basis for a correlation between the steering wheel and the steered wheels.

However, when a steering arrangement is equipped with a steering wheel angle sensor, it is important to check whether the sensor works properly or not. To this end, usually a second sensor is used and the angles detected by the two sensors are compared with each other. When both sensors indicate the same steering wheel angle, it is assumed that this angle is correct. Otherwise the system will be set to a fail safe state.

However, the use of a second sensor makes the construction complicated and expensive.

SUMMARY

The task underlying the invention is to have a simple possibility of detecting a fault of the sensor.

This object is solved with a steering wheel angle sensor as described at the outset in that fault detecting means are provided wherein the fault detecting means form a sum of the square of the sine signal and the square of the cosine signal and generates a fault signal, if the sum is not within a predetermined range.

The generation of a sine signal and of a cosine signal in response to a rotational angle between two parts is known. It is, for example, possible to use a transmitter/receiver arrangement on the first part and a target on the second part. The transmitter/receiver arrangement comprises one or more coils which are supplied with an electrical voltage having a high frequency. The target comprises a coil as well. This coil is excited and generates a counter field which is detected by a further or the same coil arrangement in a receiver of the transmitter/receiver arrangement. Theoretically, the sum of the square of the sine signal and the square of the cosine signal at the same angle is constant for all angles. The value of the sum is known or can be learned, for example, in an initializing step of the angle sensor. When one of the signals is disturbed, the resulting sum of the two squares does no longer match the constant value. If the difference between the value of the fault free angle sensor and the actual detected value differs more than a predetermined threshold value, then a fault signal is generated.

In an embodiment of the invention at least two first signal generating means and at least two second signal generating means are provided, the first signal generating means producing at least a first sine signal and a second sine signal and the second signal generating means producing at least a first cosine signal and a second cosine signal, and the fault detecting means form a first sum of the square of the first sine signal and the square of the first cosine signal and a second sum of the square of the second sine signal and the square of the second cosine signal and generates a fault signal, if the first sum is not within a predetermined first range and/or the second sum is not within a predetermined second range. In some cases it is useful to use two pairs of sine/cosine generating means, wherein these two pairs generate sine and cosine signals with different numbers of periods for 360°. This can be useful for enhancing accuracy or resolution of the angle sensor. However, in this case there are more signals available which can be used for fault detection.

In an embodiment of the invention amplification means are provided amplifying the sine signal and the cosine signal before the sine signal and the cosine signal enter the fault detecting means. When the signals are amplified, the influence of noise is smaller.

In an embodiment of the invention the amplification means have a common amplification path for the sine signal and the cosine signal. The amplification path does not alter the resulting sum.

In an embodiment of the invention the amplification means have a common amplification path for the first sine signal, the second sine signal, the first cosine signal and the second cosine signal. Even if more than one pair of sine/cosine signals is used, all signals are amplified in the same way.

In an embodiment of the invention a multiplexer is provided guiding the sine signal and the cosine signal alternatively to the amplification means. This is a simple way to use the same amplification path for the sine signal and the cosine signal.

In an embodiment of the invention the multiplexer guides the first sine signal, the second sine signal, the first cosine signal and the second cosine signal to the amplification means. In this case all signals can be amplified by the same amplification means.

The object is solved with a method as described at the outset in that a sum of the square of the sine signal and the square of the cosine signal are formed and a fault signal is generated, if the sum is not within a predetermined range.

As mentioned above, the sum of the square of the sine signal and of the square of the cosine signal for the same angle of the steering wheel is constant for all angles. If there is a deviation, this is a rather clear indication that the fault has occurred.

In an embodiment of the invention the sensor comprises at least two first signal generating means and at least two second signal generating means, the first signal generating means producing at least a first sine signal and a second sine signal and the second signal generating means producing at least a first cosine signal and a second cosine signal, and a first sum of the square of the first sine signal and the square of the first cosine signal is formed and a second sum of the square of the second sine signal and the square of the second cosine signal is formed and a fault signal is generated, if the first sum is not within a predetermined first range and/or the second sum is not within a predetermined second range.

As mentioned above, it is in some cases useful to have more than one sine/cosine pair of signals in order to increase the accuracy or the resolution of the sensor. In this case there are more signals available which can be used for fault detection.

In an embodiment of the invention the sine signal and the cosine signal are amplified before the sum is formed. In this case the influence of noise can be kept low.

In an embodiment of the invention the sine signal and the cosine signal are amplified by the same amplification means. The amplification does not adversely perfect the forming of the sum.

In an embodiment of the invention the sine signal and the cosine signal are alternatively amplified by the same amplification paths. In this way the same amplification path can be used for the sine signal and the cosine signal.

BRIEF DESCRIPTION OF THE DRAWINGS

An embodiment of the invention will now be described in more detail with reference to the drawing, wherein.

DETAILED DESCRIPTION

A steering wheel angle sensor comprises a first part and a second part. The first part is stationary and fixed, for example, to a housing. The second part is rotatably fixed to a steering wheel shaft. The first part comprises two first signal generating means 1, 2 and two second signal generating means 3, 4. To this end the first part can, for example, comprise a transmit coil which is just a circular coil around the axis of the steering wheel shaft. This transmit coil provides a mostly vertical field at the second part. The second part is in form of a target having a coil wrapped around the axis of the steering wheel shaft, so that the transmit coil induces a voltage in the target. The induced voltage is 90° ahead of the transmit coil, i.e. the current in the transmit coil. The target resonates with its induced current in phase with the induced voltage. The first part comprises as well receive coils, one receive coil having two periods and one receive coil having five periods over the circumference around the steering wheel shaft. The target has also vertical wires arranged in a pattern that generates fields of periods 2 and 5. These enable the target to couple to the periods 2 and 5 receive coils. The receive voltages induced by the target are 180° ahead of the transmit current.

In the two periods coil it is possible to obtain a first sine signal and a first cosine signal and in the five periods coil it is possible to obtain a second sine signal and a second cosine signal.

These four signals, i.e. two sine signals and two cosine signals, can be used to determine the angular position of the second part relative to the first part.

Other ways of obtaining sine and cosine signals are possible as well.

Figure 1:
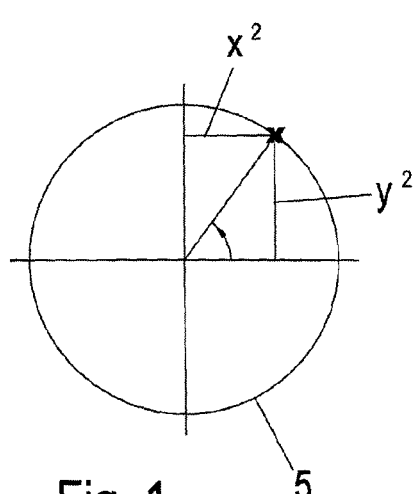
FIG. 1 is a schematic illustration for a fault free condition.
Figure 2:
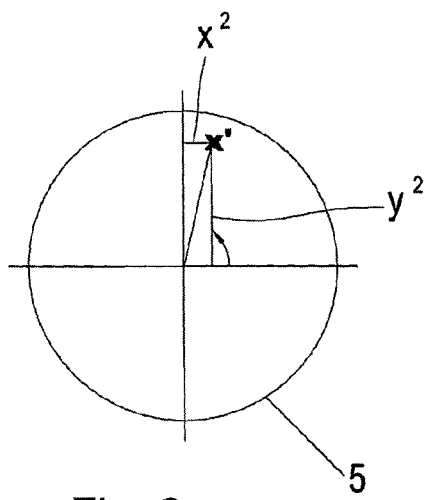
FIG. 2 is a schematic illustration for a faulty condition.

FIGS. 1 and 2 show the way how a fault is detected.

FIG. 1 shows a condition in which the sine signal and the cosine signal are obtained correctly, i.e. without any disturbance.

Independently of an angle α the sum $x^2+y^2$ is on a circle 5. In this case "x" is the sine signal and "y" is the cosine signal. The point "x" is on the circle 5, wherein a small deviation can be allowed, i.e. a range radially inwardly and radially outwardly the circle 5 is possible.

FIG. 2 shows the faulty situation, in which the sine signal x is disturbed. The cosine signal y is undisturbed. In this situation the point x' is not on the circle 5 and not within a predetermined range radially inwardly or radially outwardly the circle 5. This is a clear indication that a fault has occurred and a fault signal is generated.

Figure 3:
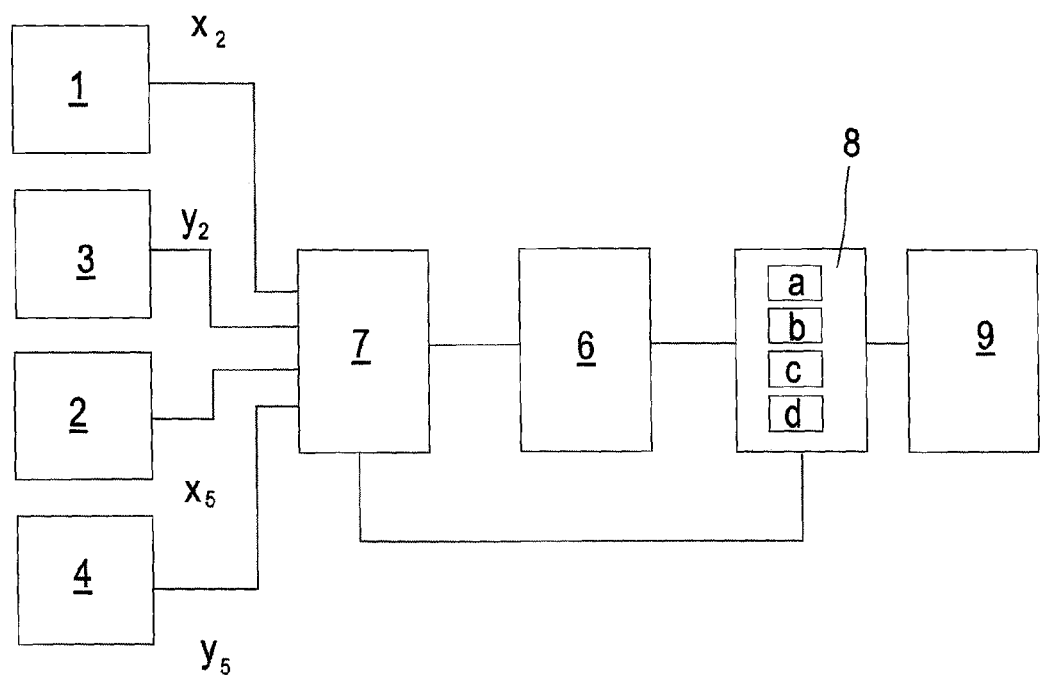
FIG. 3 is a schematic circuit diagram for the fault detecting means.

FIG. 3 shows schematically in a diagram how faults detection can be realized.

As mentioned above, the sensor comprises first signal generating means 1, 2 and second signal generating means 3, 4. More such signal generating means are, of course, possible. The first signal generating means 1, 2 produce a first sine signal $x_2$ and a second sine signal $x_5$. The second signal generating means 3, 4 produce a first cosine signal $y_2$ and a second cosine signal $y_5$. The numbers "2" and "5" indicate that these signals stem from the period 2 coil (having two periods around the circumference) and the period 5 coil (having five periods around the circumference).

The signals $x_2$, $y_2$, $x_5$, $y_5$, are amplified in an amplifier 6. All signals $x_2$, $y_2$, $x_5$, $y_5$ are amplified in the same amplification path of the amplifier 6. To this end, a multiplexer 7 is arranged between the amplifier 6 and the first signal generating means 1, 2 and the second signal generating means 3, 4, respectively.

The amplified signals can then be stored in a storage means 8 having a storage place a, b, c, d for each of the amplified signals. The multiplexer 7 is connected to the storing means 8 to ensure the correct distribution of the amplified signals to the storage places a, b, c, d of the storage means 8. In a unit 9 the sum $x_2^2+y_2^2$ is formed and the sum $x_5^2+y_5^2$ is formed. Both sums are compared to a predetermined value. If at least one of the sums does not match a predetermined value (with an allowed tolerance around) a fault signal 10 is generated.

In this case, the steering system equipped with the steering wheel angle sensor can be set in a fail save mode in which it has only a limited but safe functionality.

Since all signals are amplified by the same amplifier 6 and in particular by the same amplification path within the amplifier 6, it is rather impossible that the fault condition shown in FIG. 2 is based on a misfunction of the amplifier 6 or the multiplexer 7.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A steering wheel angle sensor comprising a first part and a second part, wherein the first part and the second part are movable relative to each other in rotational direction and the first part comprises at least one first signal generating means generating a sine signal ($x_2$, $x_5$) in response to an angular position of the second part and at least one second signal generating means generating a cosine signal ($y_2$, $y_5$) in response to the angular position of the second part, wherein fault detecting means are provided, wherein the fault detecting means form a sum of the square of the sine signal ($x_2$, $x_5$) and the square of the cosine signal ($y_2$, $y_5$) and generates a fault signal, if the sum is not within a predetermined range.

2. The sensor according to claim 1, wherein at least two first signal generating means and at least two second signal generating means are provided, the first signal generating means producing at least a first sine signal ($x_2$) and a second sine signal ($x_5$) and the second signal generating means producing at least a first cosine signal ($y_2$) and a second cosine signal ($y_5$), and the fault detecting means form a first sum of the square of the first sine signal ($x_2$) and the square of the first cosine signal ($y_5$) and a second sum of the square of the second sine signal ($x_5$) and the square of the second cosine signal ($y_5$) and generates a fault signal, if the first sum is not within a predetermined first range and/or the second sum is not within a predetermined second range.

3. The sensor according to claim 1, wherein amplification means are provided amplifying the sine signal ($x_2$, $x_5$) and the cosine signal ($y_2$, $y_5$) before the sine signal ($x_2$, $x_5$) and the cosine signal ($y_2$, $y_5$) enter the fault detecting means.

4. The sensor according to claim 3, wherein the amplification means have a common amplification path for the sine signal ($x_2$, $x_5$) and the cosine signal ($y_2$, $y_5$).

5. The sensor according to claim 4, wherein the amplification means have a common amplification path for the first sine signal ($x_2$), the second sine signal ($x_5$), the first cosine signal ($y_2$), and the second cosine signal ($y_5$).

6. The sensor according to claim 3, wherein a multiplexer is provided guiding the sine signal ($x_2$, $x_5$) and the cosine signal ($y_2$, $y_5$) alternatively to the amplification means.

7. The sensor according to claim 6, wherein the multiplexer guides the first sine signal ($x_2$), the second sine signal ($x_5$), the first cosine signal ($y_2$) and the second cosine signal ($y_5$) to the amplification means.

8. A method for fault detecting of a steering wheel angle sensor, the sensor comprising a first part and a second part, wherein the first part and the second part are movable relative to each other in rotational direction and the first part comprises at least one first signal generating means generating a sine signal in response to an angular position of the second part and at least one second signal generating means generating a cosine signal in response to the angular position of the second part, wherein a sum of the square of the sine signal and the square of the cosine signal are formed and a fault signal is generated, if the sum is not within a predetermined range.

9. The method according to claim 8, wherein the sensor comprises at least two first signal generating means and at least two second signal generating means, the first signal generating means producing at least a first sine signal and a second sine signal and the second signal generating means producing at least a first cosine signal and a second cosine signal, and a first sum of the square of the first sine signal and the square of the first cosine signal is formed and a second sum of the square of the second sine signal and the square of the second cosine signal is formed and a fault signal is generated, if the first sum is not within a predetermined first range and/or the second sum is not within a predetermined second range.

10. The method according to claim 8, wherein the sine signal and the cosine signal are amplified before the sum is formed.

11. The method according to claim 10, wherein the sine signal and the cosine signal are amplified by the same amplification means.

12. The method according to claim 11, wherein the sine signal and the cosine signal are alternatively amplified by the same amplification paths.

13. The sensor according to claim 2, wherein amplification means are provided amplifying the sine signal ($x_2$, $x_5$) and the cosine signal ($y_2$, $y_5$) before the sine signal ($x_2$, $x_5$) and the cosine signal ($y_2$, $y_5$) enter the fault detecting means.

14. The sensor according to claim 4, wherein a multiplexer is provided guiding the sine signal ($x_2$, $x_5$) and the cosine signal ($y_2$, $y_5$) alternatively to the amplification means.

15. The sensor according to claim 5, wherein a multiplexer is provided guiding the sine signal ($x_2$, $x_5$) and the cosine signal ($y_2$, $y_5$) alternatively to the amplification means.

16. The method according to claim 9, wherein the sine signal and the cosine signal are amplified before the sum is formed.

* * * * *